US008849467B2

(12) United States Patent
Korus (10) Patent No.: US 8,849,467 B2
(45) Date of Patent: Sep. 30, 2014

(54) CONTROL SYSTEM FOR STOPPING OR REVERSING MOVEMENT OF AN IRRIGATION SYSTEM

(75) Inventor: Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 723 days.

(21) Appl. No.: 13/182,302

(22) Filed: Jul. 13, 2011

(65) Prior Publication Data

US 2013/0018509 A1 Jan. 17, 2013

(51) Int. Cl.
*A01G 25/09* (2006.01)
*A01G 25/16* (2006.01)
*B05B 3/00* (2006.01)
*B05B 9/06* (2006.01)
*G05D 7/00* (2006.01)

(52) U.S. Cl.
CPC .............. *A01G 25/092* (2013.01); *A01G 25/16* (2013.01); *A01G 25/09* (2013.01); *B05B 9/06* (2013.01)
USPC ............ 700/284; 700/283; 239/722; 239/723

(58) Field of Classification Search
CPC ..... A01G 25/092; A01G 25/09; A01G 25/16; B05B 9/06
USPC ........................... 700/283, 284; 239/722, 723
See application file for complete search history.

(56) References Cited

U.S. PATENT DOCUMENTS

| 4,036,436 | A | | 7/1977 | Standal | |
|---|---|---|---|---|---|
| 4,763,836 | A | * | 8/1988 | Lyle et al. | 239/69 |
| 4,795,099 | A | | 1/1989 | Wolfbauer et al. | |
| 5,020,730 | A | | 6/1991 | Perroud et al. | |
| 5,678,771 | A | * | 10/1997 | Chapman | 239/727 |
| 6,928,339 | B2 | * | 8/2005 | Barker | 700/284 |
| 6,938,829 | B2 | * | 9/2005 | Doherty et al. | 239/1 |
| 2002/0008167 | A1 | * | 1/2002 | Haberland et al. | 239/722 |
| 2002/0107582 | A1 | * | 8/2002 | Pollak et al. | 700/19 |
| 2009/0314862 | A1 | * | 12/2009 | Bauman et al. | 239/743 |
| 2010/0288846 | A1 | * | 11/2010 | Nelson et al. | 239/1 |

FOREIGN PATENT DOCUMENTS

EP 2138032 12/2009
WO WO 9501719 A1 * 1/1995

* cited by examiner

*Primary Examiner* — Mohammad Ali
*Assistant Examiner* — Jennifer L Norton
(74) *Attorney, Agent, or Firm* — Hovey Williams LLP (57) ABSTRACT

A control system for stopping or reversing movement of an irrigation system comprises an electronic proximity sensor and a control device. The electronic proximity sensor is configured for mounting to the irrigation system and operable to detect a target. The control device is responsive to the electronic proximity sensor for stopping or reversing movement of the irrigation system when the electronic proximity sensor detects the target.

9 Claims, 7 Drawing Sheets

CONTROL SYSTEM FOR STOPPING OR REVERSING MOVEMENT OF AN IRRIGATION SYSTEM

BACKGROUND OF THE INVENTION

1. Field of the Invention

The present invention relates to agricultural irrigation systems. More particularly, the invention relates to a control system for stopping and/or reversing movement of an irrigation system.

2. Background

Agricultural irrigation systems such as central pivot irrigation machines and lateral move irrigation machines are commonly used to irrigate crops. A central pivot irrigation machine typically includes, among other things, a central pivot communicating with a pressurized water supply and a series of spans formed from mobile support towers connected to the central pivot and to one another by truss-type framework sections. The mobile support towers are supported on wheels that are driven by a motor on each tower. A water distribution conduit is supported by the framework sections and a number of sprinkler heads, spray guns, drop nozzles, or other fluid-emitting devices are spaced along the length of the conduit. A lateral move irrigation system is similar except it does not include a central pivot but instead has several aligned spans that move laterally across a rectangular-shaped field.

Irrigation systems must be stopped and/or reversed when they reach the end of an area to be irrigated or an obstacle such as a building tree, road, etc. To do so, a typical irrigation system includes a quill or rod extending from one of its towers and a barrier positioned near a boundary of the area being irrigated. When the irrigation system approaches the boundary, the quill or rod touches the barrier and shifts positions to operate a switch. The switch then stops and/or reverses the direction of the irrigation system.

Unfortunately, the quills and barriers are relatively expensive and difficult to install. Moreover, the barrier can block movement of tractors and other vehicles that need access to the area being irrigated, and the quills or rods are occasionally tripped by tree branches, tall crops, and other objects in the path of the irrigation system. This may result in inadvertent stopping and/or reversing of the irrigation system and thus over-watering of some areas and under watering of others.

SUMMARY

The present invention solves the above described problems and provides an improved method and system for stopping and/or reversing movement of an irrigation system. One embodiment of the invention is a control system broadly comprising an electronic proximity sensor for mounting to an irrigation system and operable to detect a target; and a control device responsive to the electronic proximity sensor for stopping or reversing movement of the irrigation system when the electronic proximity sensor detects the target.

In one embodiment, the electronic proximity sensor is an inductive proximity sensor and the target is a section of metal pipe or other metallic object that has been placed on or in the ground along a path of travel of the irrigation system.

The control system may also comprise a mounting assembly for suspending the electronic proximity sensor below the irrigation system so that the electronic proximity sensor drags along or passes over a ground surface traversed by the irrigation system. An embodiment of the mounting assembly comprises a mounting bracket configured to be supported on the irrigation system and a flexible tether having a first end pivotally supported to the mounting bracket and a second end suspended below the mounting bracket so as to hover over or touch the ground surface traversed by the irrigation system. The electronic proximity sensor may be secured to or embedded within the second end of the tether.

In operation, the mobile tower to which the control system is attached drags the second end of the tether across or above the ground as the mobile tower traverses an area being irrigated. When the mobile tower approaches a boundary, the tether passes over a target that has been placed in the ground near the boundary. The electronic proximity sensor in the tether senses the target, and the control device responds by stopping and/or reversing at least one of the drive motors of the irrigation system.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures. For example, the principles of the present invention are not limited to central pivot irrigation systems, but may be implemented in other types of irrigation systems including linear move irrigation systems.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
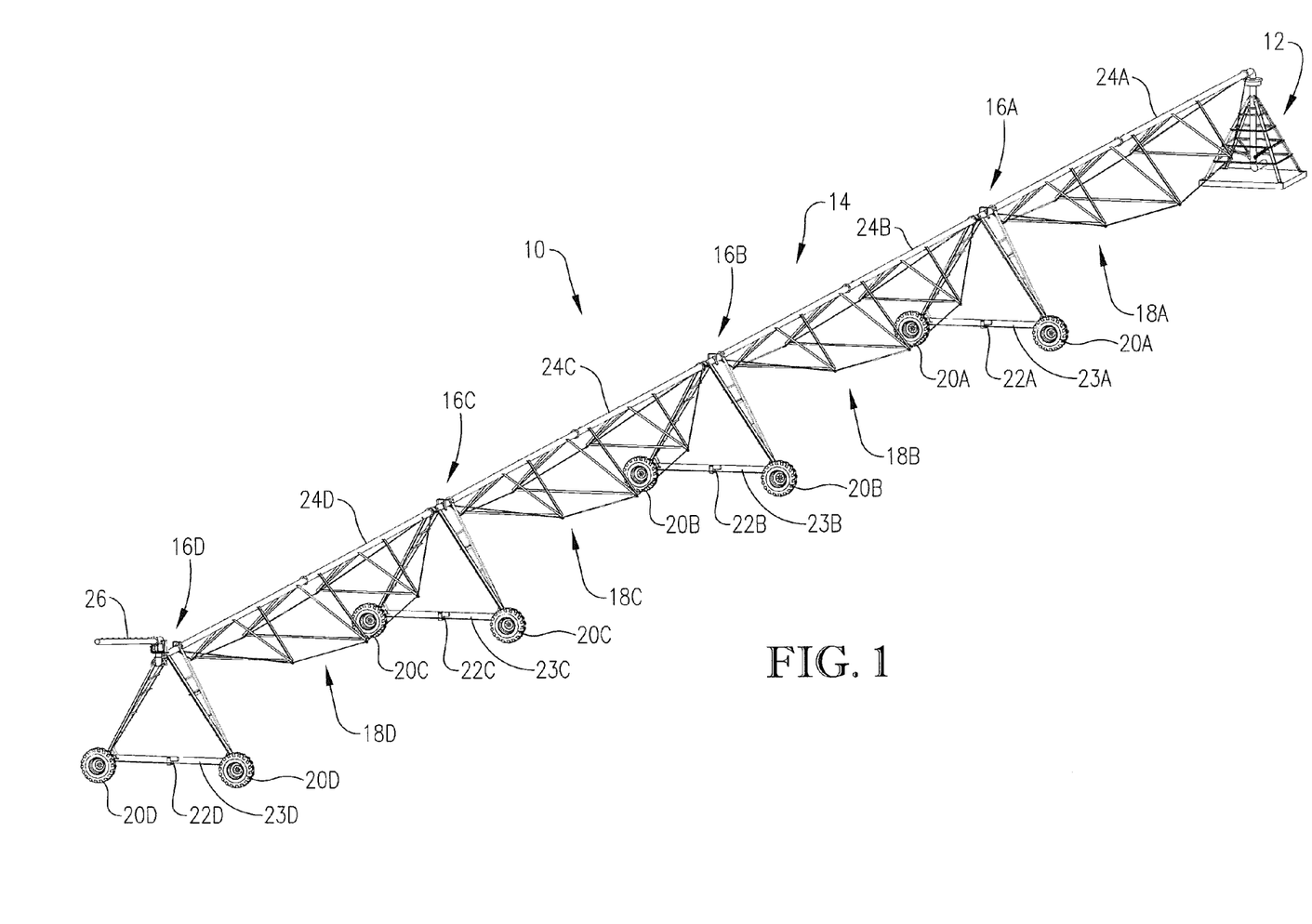
FIG. 1 is a perspective view of an exemplary central pivot irrigation system on which the control system of the present invention may be implemented.

Turning now to the drawing figures, and initially FIG. 1, an exemplary irrigation system 10 on which principles of the present invention may be implemented is illustrated. An embodiment of the irrigation system 10 is a central pivot irrigation system and broadly comprises a fixed central pivot 12 and a main section 14 pivotally connected to the central pivot. The irrigation system 10 may also comprise an extension arm (also commonly referred to as a "swing arm" or "corner arm") pivotally connected to the free end of the main section.

The fixed central pivot 12 may be a tower or any other support structure about which the main section 14 may pivot. The central pivot has access to a well, water tank, or other source of water and may also be coupled with a tank or other source of agricultural products to inject fertilizers, pesticides and/or other chemicals into the water for application during irrigation.

The main section 14 may comprise any number of mobile support towers 16A-D, the outermost 16D of which is referred to herein as an "end tower". The support towers are connected to the fixed central pivot 12 and to one another by truss sections 18A-D or other supports to form a number of interconnected spans.

The mobile towers 16A-D have wheels 20A-D, at least one of which on each is driven by a tower suitable drive motor 22A-D. Each motor 22A-D turns at least one of its wheels 22A-D through a drive shaft in a drive tube 23A-D to move its mobile tower and thus the main section in a circle about the central pivot to irrigate a field. The motors 22A-D may include integral or external relays so they may be turned on, off, and reversed as described below. The motors may also have several speeds or be equipped with variable speed drives.

Although not required, some or all of the towers 16A-D may be equipped with steerable wheels pivoted about upright axes by suitable steering motors so that the towers can follow a predetermined track. U.S. Pat. No. 4,508,269 in the name of Davis et al. is hereby incorporated by reference in its entirety into the present specification for a disclosure of ground drive motors and steering motors associated with an irrigation machine. As is also well known, the drive motors for the towers are controlled by a suitable safety system such that they may be slowed or completely shut down in the event of the detection of an adverse circumstance, all of which is disclosed, for example, in U.S. Pat. No. 6,042,031 to Christensen, et al. incorporated herein by reference in its entirety.

Each of the truss sections 18A-D carries or otherwise supports a conduit section 24A-D or other fluid distribution mechanism that is connected in fluid communication with all other conduit sections. A plurality of sprinkler heads, spray guns, drop nozzles, or other fluid-emitting devices are spaced along the conduit sections 24A-D to apply water and/or other fluids to land underneath the irrigation system.

The irrigation system 10 may also include an optional extension arm (not shown) pivotally connected to the end tower 16D and supported by a swing tower with steerable wheels driven by a motor. The extension arm may be joined to the end tower by an articulating pivot joint. The extension arm is folded in relative to the end tower when it is not irrigating a corner of a field and may be pivoted outwardly away from the end tower while irrigating the corners of a field.

The irrigation system 10 may also include one or more high pressure sprayers or end guns 26 mounted to the end tower 16D or to the end of the extension arm. The end guns are activated at the corners of a field or other designated areas to increase the amount of land that can be irrigated.

The irrigation system 10 illustrated in FIG. 1 has four mobile support towers 16A-D; however, it may comprise any number of mobile support towers, truss sections, wheels, and drive motors without departing from the scope of the present invention.

The irrigation system 10 may also include a main control system for controlling movement of the mobile towers 16A-D and operation of the fluid-emitting devices in accordance with an irrigation design program. The main control system may include a processor or other computing device with inputs that receive positional information from one or more GPS receivers mounted to the end tower or elsewhere. The processor may alternatively receive position information from angle encoders mounted between the central pivot and a first span of the main section. The processor may also include outputs connected to relay-controlled valves connected to the water-emitting devices and relay-controlled electric motors connected to the drive wheels of the mobile towers.

Figure 7:
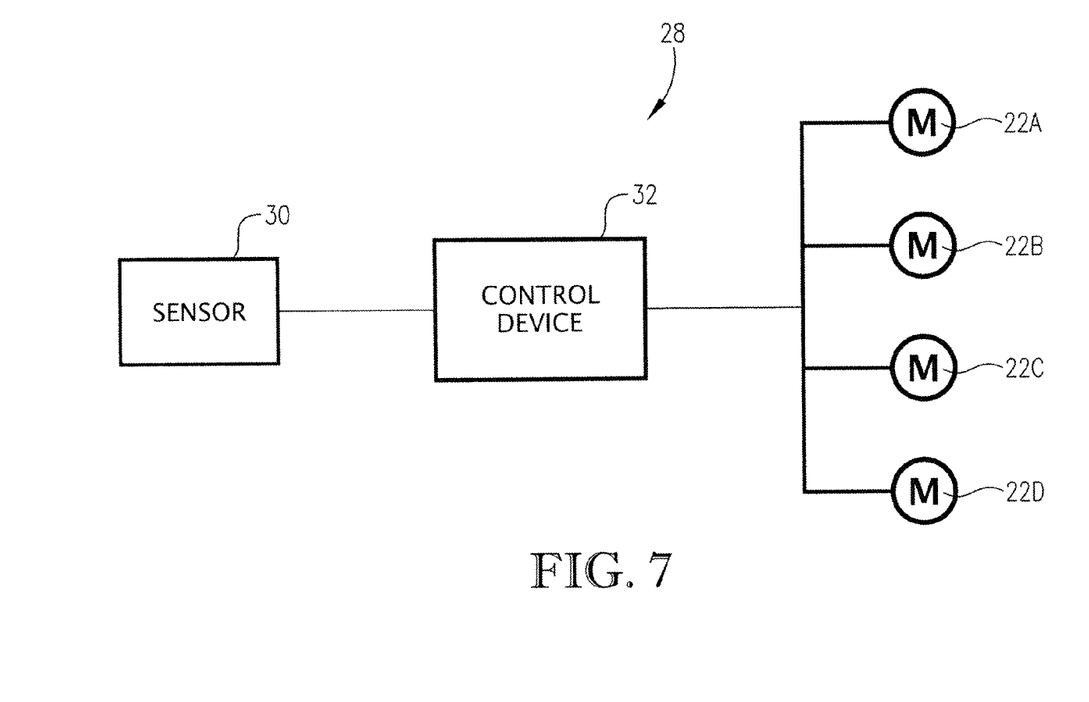
FIG. 7 is a block diagram of an exemplary embodiment of the control system shown coupled with a plurality of irrigation system drive motors.

In accordance with aspects of the present invention, the irrigation system 10 also includes a control system 28 for stopping and/or reversing movement of the irrigation system. The control system 28 can be implemented with hardware, software, firmware, or a combination thereof. An embodiment of the control system 28 is illustrated in FIG. 7 and broadly comprises a proximity sensor 30 and a control device 32. The illustrated control system 28 is shown controlling four drive motors 22A-D for a four span irrigation system such as the one shown in FIG. 1, but as mentioned above, the irrigation system 10 may have any number of spans and motors.

The proximity sensor 30 may be any device capable of detecting or sensing a target. In one embodiment, the proximity sensor is an electronic inductive type proximity sensor operable to sense or detect a metallic target 34. Inductive proximity sensors sense metallic objects by generating magnetic fields. They are similar in principle to metal detectors. A coil of wire is charged with electrical current, and an electronic circuit measures this current. If a metallic object get close enough to the coil, the current will increase and the proximity sensor will open or close a switch accordingly.

Figure 2:
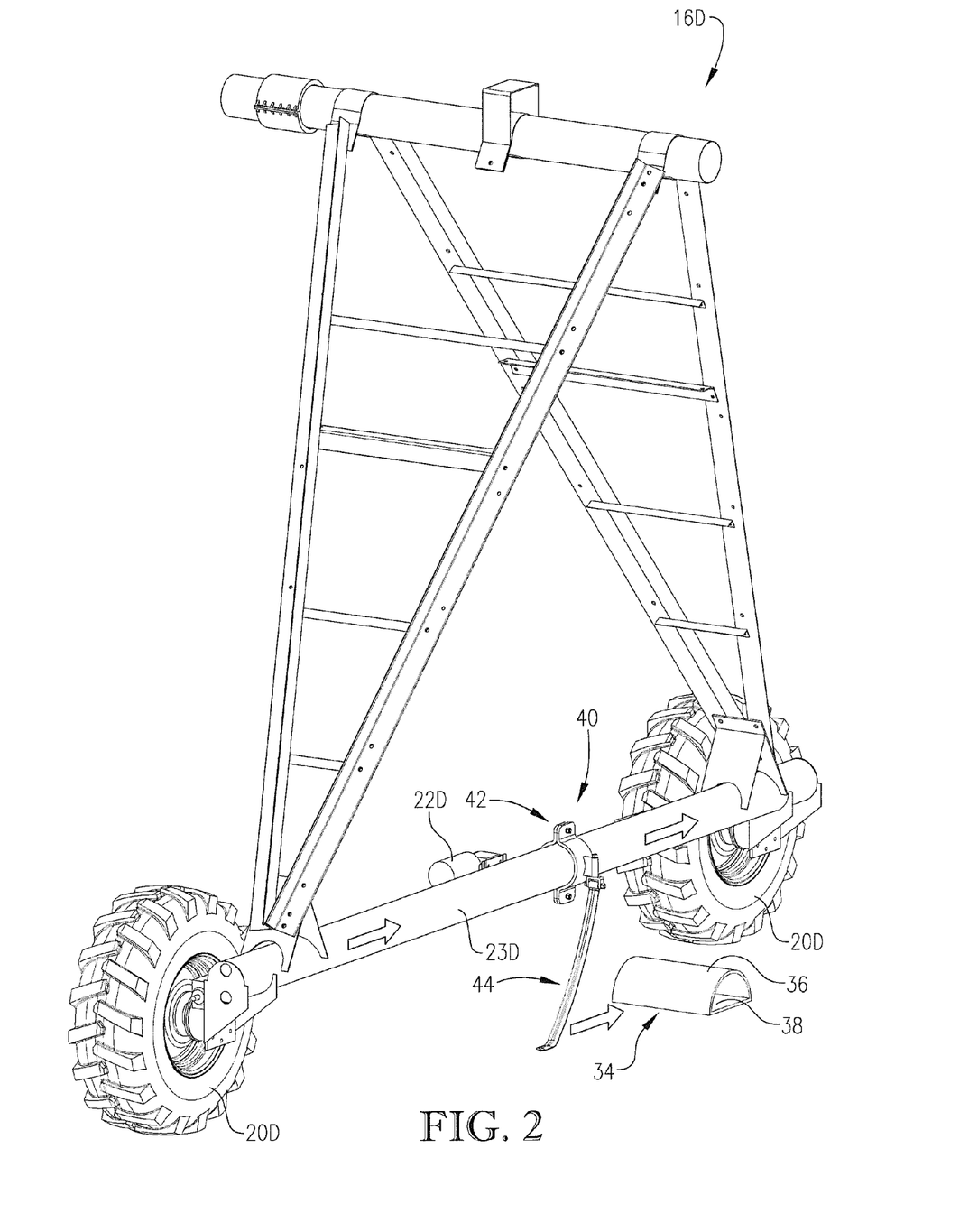
FIG. 2 is a perspective view of one of the mobile towers of the irrigation system and the attached control system shown before the control system senses a target.
Figure 3:
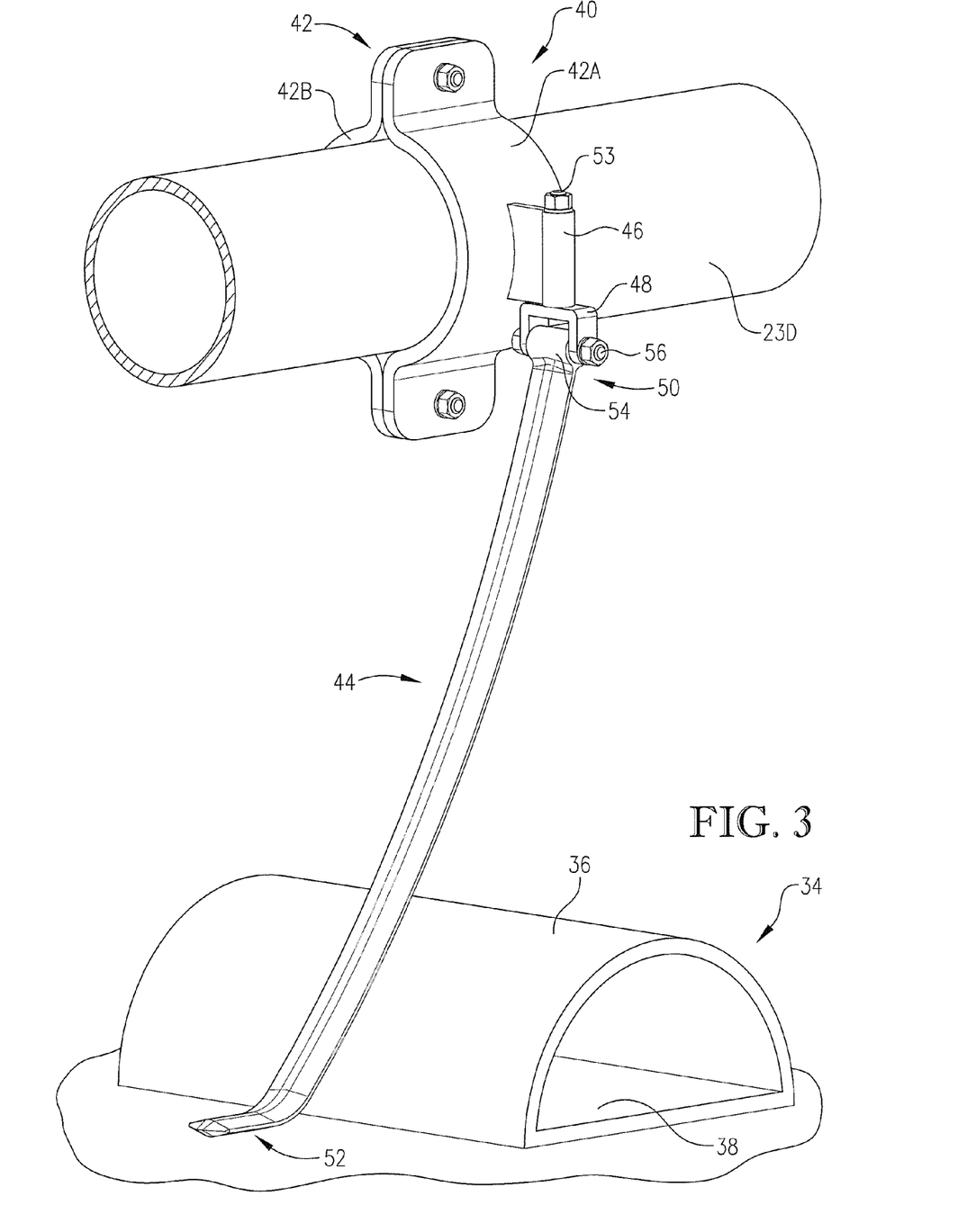
FIG. 3 is an enlarged partial perspective view of the mobile tower and control system as the tether contacts the target.
Figure 4:
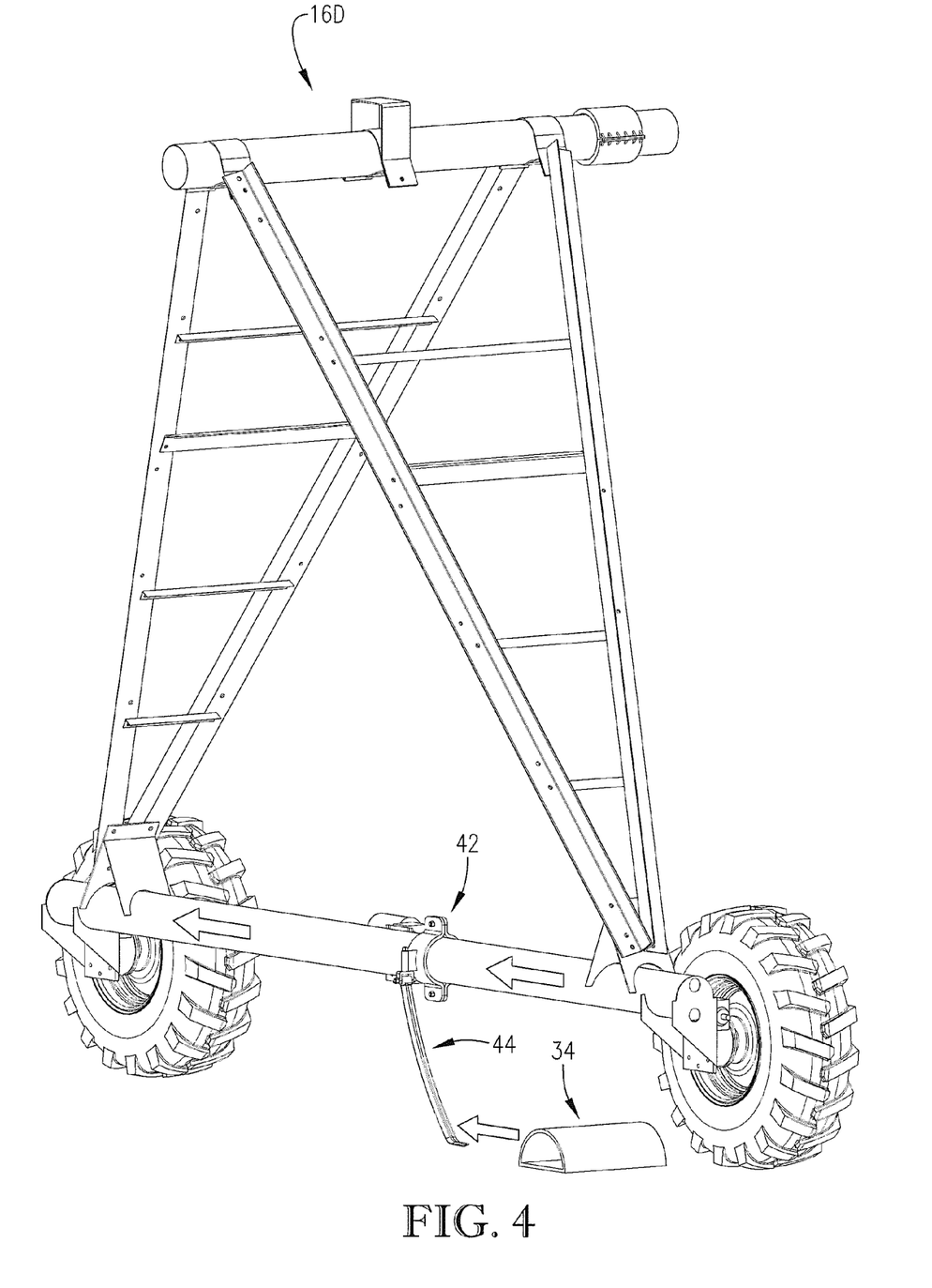
FIG. 4 is a perspective view of the mobile tower after it has reversed direction and begins to head away from the target.

The target 34 may be of any shape or size, and is made of metallic material so it can be sensed by the proximity sensor. The target preferably has a curved upper surface as shown in the drawing figures so as present less resistance to the tether as described below and to resist being covered by dirt due to erosion. One embodiment of the target 34 that may be used with the control system is illustrated in FIGS. 2-4 and includes a semi-circular or otherwise rounded top surface 36 and a planar base plate 38. This embodiment of the target may be fabricated from an approximate 8" diameter 24" long section of steel tube that has been cut lengthwise to form a semi-cylinder and welded to the planar base plate 38. A rod or other object may depend from the base plate 38 so as to anchor the target into the ground.

The control device 32 may be any device capable of controlling operation of at least one of the drive motors 22A-D to stop and/or reverse the mobile towers 16A-D when the proximity sensor 30 detects the target 34 as explained in more detail below. The control device 32 may comprise or include any number or combination of processors, controllers, ASICs, computers or other control circuitry.

Some or all of the functionality of the control device 32 or other components of the control system 28 may be performed by the main control system or vice versa. In other words, the irrigation system 10 may include a separate main control system and control system 28 or a single control system that integrates some or all of the functions of the main control system and control system 28.

The control device 32 and other components of the control system 28 may be enclosed in or supported on a weatherproof housing for protection from moisture, vibration, and impact. The housing may be positioned anywhere on or near the irrigation system 10 and may be constructed from a suitable vibration- and impact-resistant material such as, for example, plastic, nylon, aluminum, or any combination thereof and may include one or more appropriate gaskets or seals to make it substantially waterproof or resistant.

The proximity sensor 30 and the control device 32 need not be physically connected to one another since wireless communication among the components is permissible and intended to fall within the scope of the present invention.

The control system 38 may also comprise a mounting assembly generally referred to by the numeral 40 for suspending the proximity sensor 30 below the irrigation system 10 so that the proximity sensor passes over a ground surface traversed by the irrigation system. An embodiment of the mounting assembly 40 is best illustrated in FIGS. 2 and 3 and broadly comprises a mounting bracket 42 and a tether 44.

An embodiment of the mounting bracket 42 is a pipe-type bracket having a pair of mating sections 42A, B that are positioned on opposite sides of the drive tube 23D of one mobile tower 16D and clamped together by screws or bolts as illustrated. A cylindrical vertically-extending sleeve 46 extends from one of the bracket sections 42A and supports a depending U-shaped bracket 48. The bracket 48 is supported to the sleeve 46 by a bolt or pin 53 received within the sleeve 46 so that the bracket 48 may pivot about a vertical axis extending through the sleeve 46.

The tether 44 is preferably formed from an elongated strip of leather, rubber, or other flexible material and has a first end 50 pivotally supported to the mounting bracket 42 and a second end 52 suspended below the mounting bracket so as to touch or hover just above the ground surface traversed by the irrigation system. An embodiment of the tether 44 has a loop or sleeve 54 in its first end 50 that is supported between the alms of the bracket 48 by a bolt or pin 56 so that the tether 44 may pivot about the bolt or pin 56. In one embodiment, the proximity sensor 30 is attached to or embedded in the second end 52 of the tether 44 so that it may detect the target 34 as the tether is dragged across or over the target.

The mounting bracket 42 and the tether 44 may be positioned so that the tether is outside the wheel tracks of the mobile tower as depicted in FIGS. 2-4. Alternatively, the bracket sections 42A and 42B may be flipped so that the tether 44 is positioned inside the wheel tracks. The latter mounting arrangement is preferable when the irrigation system 10 is used in fields with dense crops that may interfere with the passage of the tether 44 because the wheels of the drive tower clear a path for the tether.

In operation, the mobile tower 16D to which the mounting bracket 42 and tether 44 are attached drags the second end 52 of the tether 44 across or immediately above the ground as the mobile tower traverses an area being irrigated. When the mobile tower 16D approaches a boundary, the tether 44 passes over the target 34 that has been placed near the boundary. The proximity sensor 30 in the tether senses the target 34, and the control device 32 responds by stopping and/or reversing at least one of the drive motors of the irrigation system.

Once the mobile tower 16D has reversed direction, the tether 44 pivots about the bracket 48 so that it again drags behind the mobile tower as it heads away from the target as depicted in FIG. 4. The mobile tower may then head toward another target positioned near an opposite boundary of the field.

Figure 5:
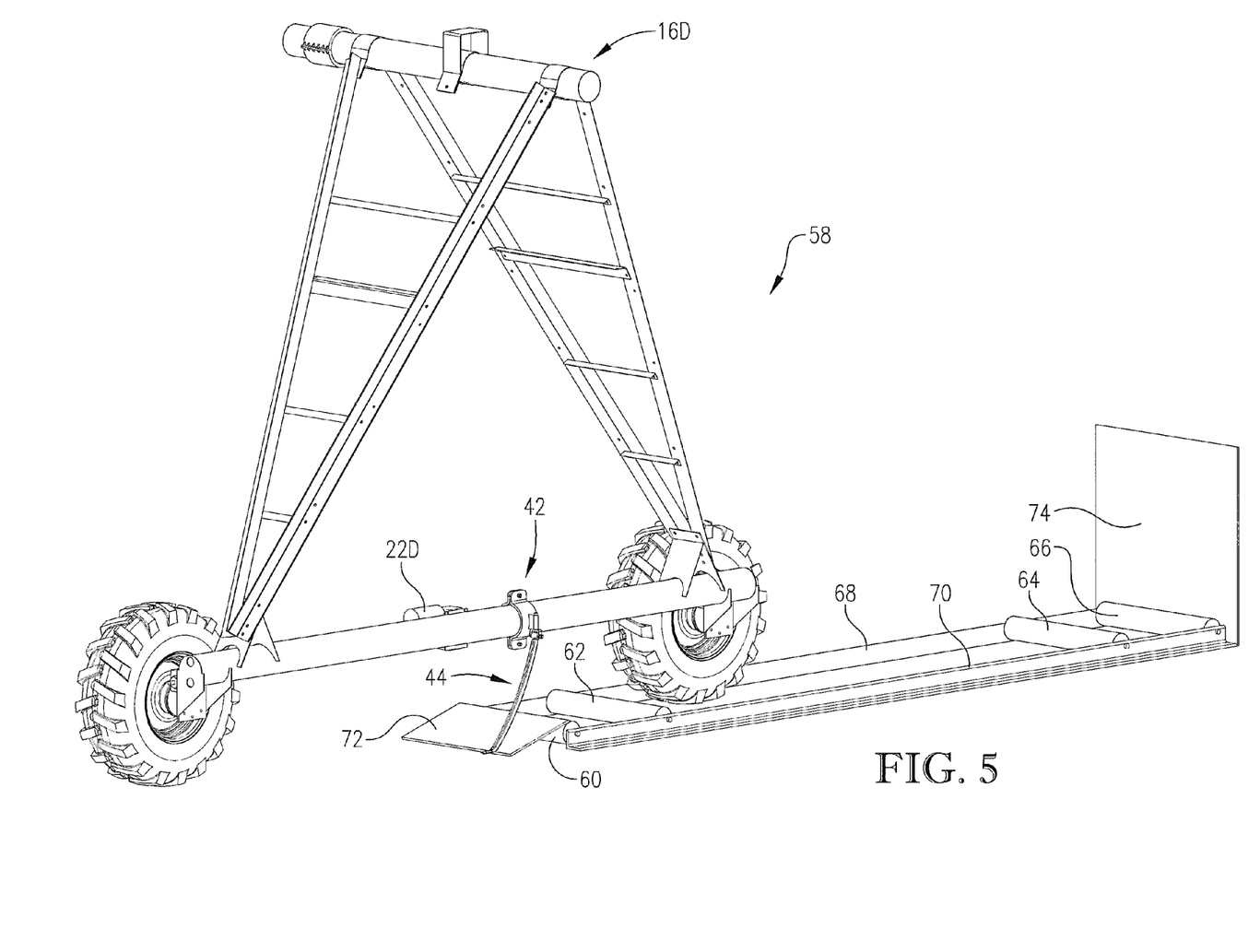
FIG. 5 is a perspective view of the mobile tower and the control system shown with a target assembly constructed in accordance with another embodiment of the invention.

FIG. 5 depicts another target assembly 58 that may be used to trigger the control system 28. The target assembly 58 includes a number of spaced-apart rollers 60, 62, 64, 66 supported between a pair of side-rails 68, 70. A metallic ramp 72 is attached over the leading roller 60 and serves as a target for the proximity sensor 30. An upstanding plate 74, gate, or other structure is attached near the last roller 66 to serve as a barrier. During operation of the irrigation system 10, the leading wheel of the mobile tower 16D travels up the ramp 72 and over the first two rollers 60, 62. At about the time the wheel passes the second roller, the second end of the tether 44 contacts the ramp 72 so that the proximity sensor 30 may detect it. The control device 32 then stops and/or reverses the motor 22D on the mobile tower as described above. If the proximity sensor 30 does not properly sense the ramp 72 or the control system otherwise malfunctions, the mobile tower continues to move forward until its leading tire is positioned between the rollers 64 and 66 and the lagging tire is positioned between the rollers 60 and 62. The tires then freewheel on the rollers, and the barrier 74 prevents further progress of the tires, to prevent the mobile tower from advancing any further.

Figure 6:
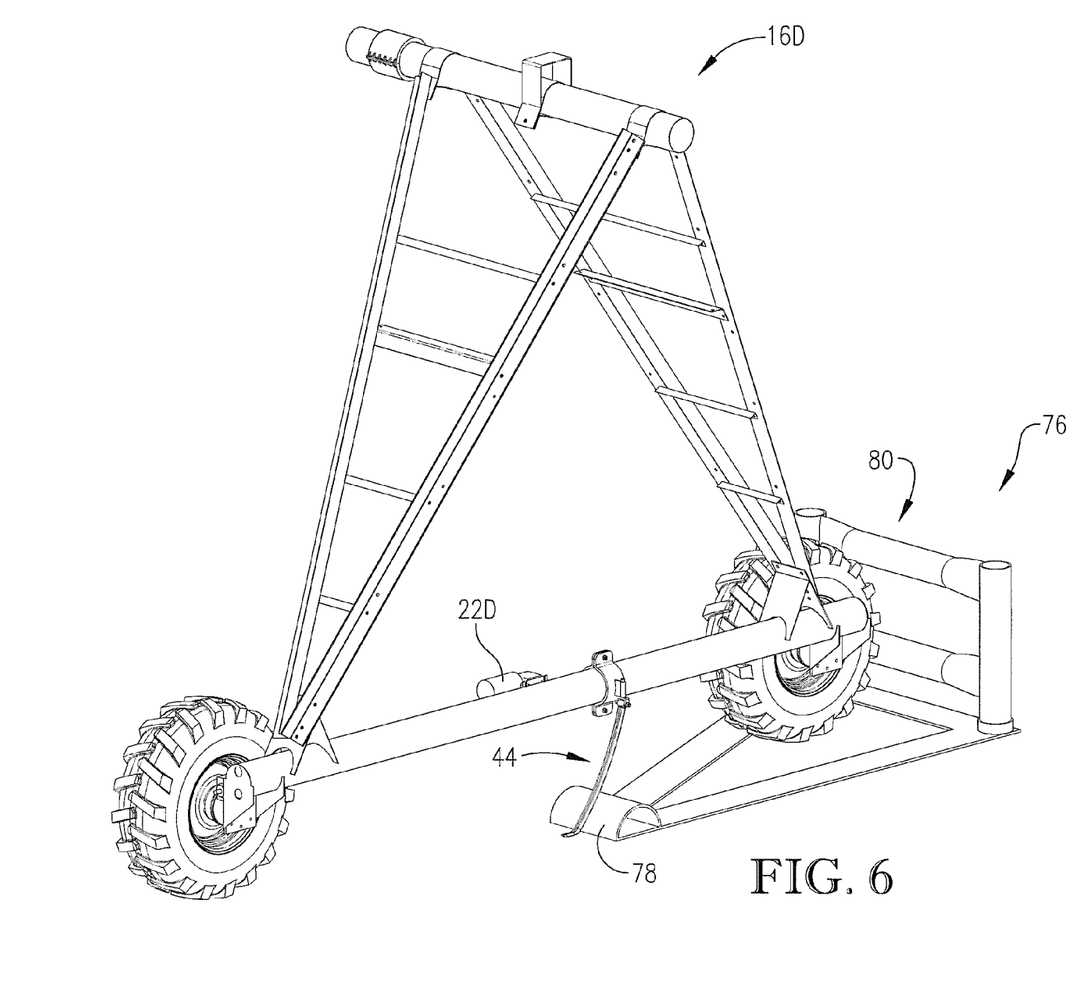
FIG. 6 is a perspective view of the mobile tower and the control system shown with a target assembly constructed in accordance with yet another embodiment of the invention.

FIG. 6 depicts another target assembly 76 that may be used to trigger the control system 28. The target assembly 76 includes a semi-cylindrical target 78 for the proximity sensor 30 and an upstanding gate 80 or barricade that serves as a barrier. During operation of the irrigation system, the leading wheel of the mobile tower 16D travels over the target 78, and shortly thereafter, the second end of the tether 44 contacts the target 78 so that the proximity sensor 30 may detect it. The control device 28 then stops and/or reverses the motor 22D on the mobile tower as described above. If the proximity sensor 30 does not properly sense the target 78 or the control system 28 otherwise malfunctions, the barrier 80 prevents further progress of the tires to prevent the mobile tower from advancing any further.

Although the invention has been described with reference to the embodiments illustrated in the attached drawing figures, it is noted that equivalents may be employed and substitutions made herein without departing from the scope of the invention as recited in the claims. For example, the principles of the present invention are not limited to the illustrated central pivot irrigation systems but may be implemented in any type of irrigation system including linear move irrigation systems.

Having thus described the preferred embodiment of the invention, what is claimed as new and desired to be protected by Letters Patent includes the following:

1. A control system for stopping or reversing movement of an irrigation system, the control system comprising:

an inductive proximity sensor for mounting to the irrigation system and operable to detect a metallic object placed on or in a ground surface traversed by the irrigation system; and a control device responsive to the inductive proximity sensor for stopping or reversing movement of the irrigation system when the inductive proximity sensor detects the metallic object.

2. The control system as set forth in claim 1, wherein the metallic object is placed on a ground surface traversed by the irrigation system and wherein the control system further comprises a mounting assembly for suspending the inductive proximity sensor below the irrigation system so that the inductive proximity sensor passes over the metallic object.

3. The control system as set forth in claim 2, wherein the mounting assembly comprises a mounting bracket configured to be supported on a drive tube of a mobile tower of the irrigation system.

4. The control system as set forth in claim 3, wherein the mounting assembly further comprises a flexible tether having a first end pivotally supported to the mounting bracket and a second end suspended below the mounting bracket so as to touch the metallic object when the irrigation system traverses the ground surface in which the metallic object is placed.

5. The control system as set forth in claim 4, wherein the inductive proximity sensor is secured to the second end of the tether.

6. The control system as set forth in claim 4, wherein the inductive proximity sensor is embedded within the second end of the tether.

7. A control system for stopping or reversing movement of an irrigation system, the control system comprising:

a mounting bracket for attachment to the irrigation system;

a tether having a first end pivotally supported to the mounting bracket and a second end suspended below the mounting bracket;

an inductive proximity sensor secured to the second end of the tether and operable to detect a metallic object placed on or in a ground surface traversed by the irrigation system; and a control device responsive to the inductive proximity sensor for stopping or reversing movement of the irrigation system when the inductive proximity sensor detects the metallic object.

8. The control system as set forth in claim 7, wherein the inductive proximity sensor is embedded within the second end of the tether.

9. The control system as set forth in claim 7, wherein the mounting bracket is configured to be mounted to a drive tube of a mobile tower of the irrigation system so that the second end of the tether and the inductive proximity sensor are suspended in a wheel track of the irrigation system.

* * * * *